(12) United States Patent
Cha et al.

(10) Patent No.: US 9,056,583 B2
(45) Date of Patent: Jun. 16, 2015

(54) OPERATING APPARATUS AND OPERATING CONTROL METHOD OF SIDE STEP OF VEHICLE

(71) Applicant: Hyundai Motor Company, Seoul (KR)

(72) Inventors: Dong Eun Cha, Suwon-si (KR); Hyun Gyung Kim, Hwaseong-si (KR); Seung Mok Lee, Osan-si (KR); Phil Jung Jeong, Yongin-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/084,500

(22) Filed: Nov. 19, 2013

(65) Prior Publication Data
US 2015/0042060 A1 Feb. 12, 2015

(30) Foreign Application Priority Data
Aug. 9, 2013 (KR) .......................... 10-2013-0094808

(51) Int. Cl.
*B60R 3/02* (2006.01)
(52) U.S. Cl.
CPC ........................................ *B60R 3/02* (2013.01)
(58) Field of Classification Search
USPC ...................................... 280/163, 164.1, 166
See application file for complete search history.

(56) References Cited

U.S. PATENT DOCUMENTS

| | | | | |
|---|---|---|---|---|
| 2,797,104 | A * | 6/1957 | Drobney et al. | 280/166 |
| 6,830,257 | B2 * | 12/2004 | Leitner | 280/166 |
| 6,834,875 | B2 * | 12/2004 | Leitner et al. | 280/166 |
| 7,163,221 | B2 * | 1/2007 | Leitner | 280/166 |
| 7,341,264 | B2 * | 3/2008 | Swannie | 280/164.1 |
| 7,607,674 | B2 | 10/2009 | Watson | |
| 8,602,431 | B1 * | 12/2013 | May | 280/166 |
| 2006/0181049 | A1 * | 8/2006 | Kobayashi et al. | 280/166 |
| 2010/0194070 | A1 * | 8/2010 | Stauffer et al. | 280/166 |
| 2012/0139206 | A1 * | 6/2012 | May | 280/166 |
| 2014/0183835 | A1 * | 7/2014 | Cha et al. | 280/166 |

FOREIGN PATENT DOCUMENTS

| | | |
|---|---|---|
| JP | 2007-269083 A | 10/2007 |
| KR | 10-1999-0050624 A | 7/1999 |
| KR | 10-2005-0031491 A | 4/2005 |
| KR | 10-2005-0113960 A | 12/2005 |
| KR | 10-0960125 B1 | 5/2010 |

* cited by examiner

*Primary Examiner* — Frank Vanaman
(74) *Attorney, Agent, or Firm* — Morgan, Lewis & Bockius LLP

(57) ABSTRACT

An operating apparatus and operating control method of a side step of a vehicle controls the opening operation of the side step by being operated in conjunction with an operation of a vehicle door and by detecting whether an obstacle is present or not in an opening operation space of a side step of left front, left rear, right front and right rear side steps (11, 12, 13 and 14), opens the side step when it is determined that no obstacle is present in the opening operation space of the side step, and provides an alarm to a user when it is required to avoid the opening of the side step.

12 Claims, 6 Drawing Sheets

Closed

Being opened

Being opened

Completely opened

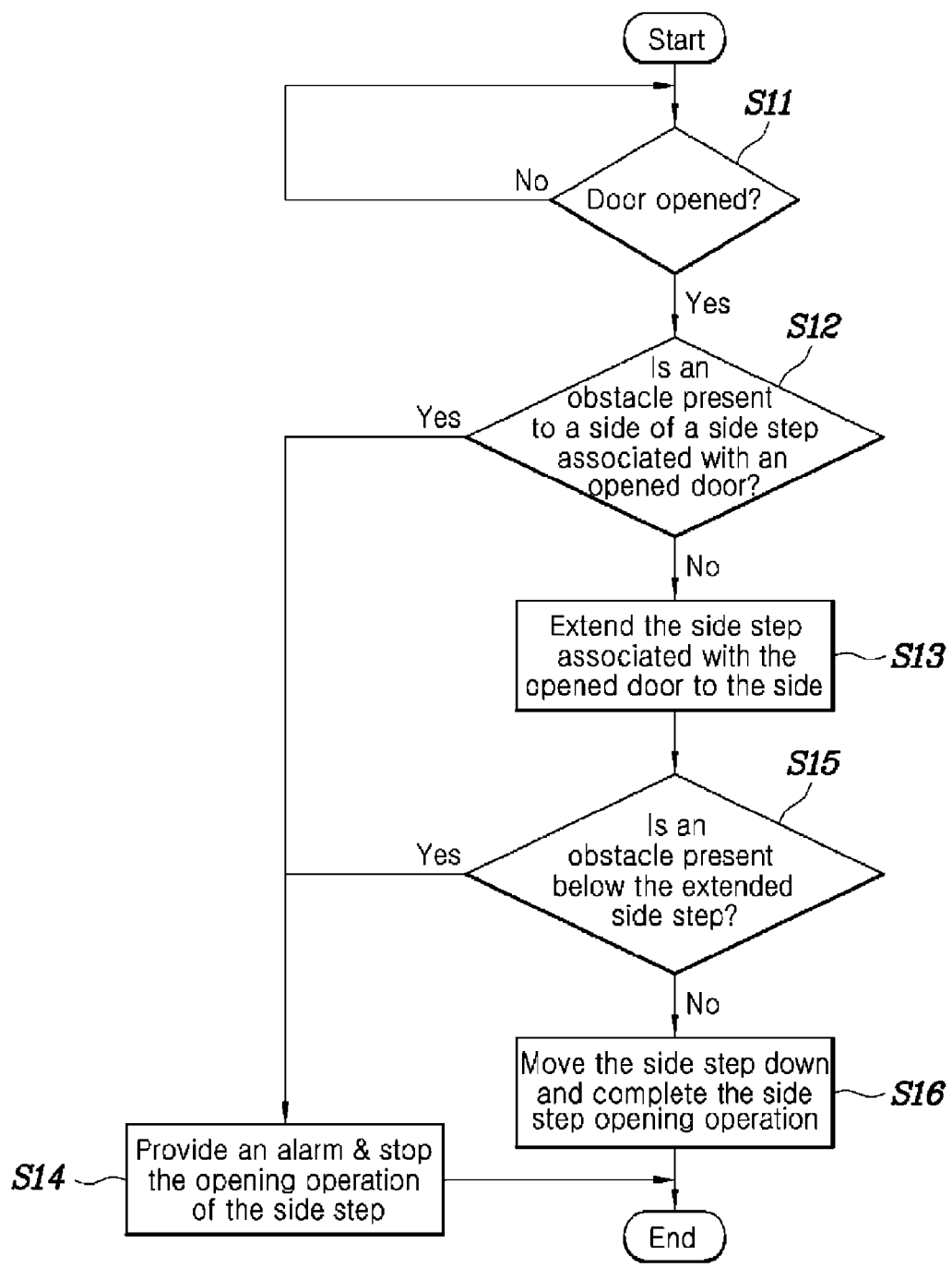

OPERATING APPARATUS AND OPERATING CONTROL METHOD OF SIDE STEP OF VEHICLE

CROSS REFERENCE TO RELATED APPLICATION

The present application claims priority to Korean Patent Application No. 10-2013-0094808 filed on Aug. 9, 2013, the entire contents of which is incorporated herein for all purposes by this reference.

BACKGROUND OF THE INVENTION

1. Field of the Invention

The present invention relates, in general, to an operating apparatus and operating control method of a side step of a vehicle and, more particularly, to an operating apparatus and operating control method of a side step of a vehicle which can control the opening operation of the side step according to whether an obstacle is present or not in the opening direction of the side step.

2. Description of Related Art

Generally, a side step is provided in an RV (Recreational Vehicle), the bottom of which is higher than those of typical passenger vehicles, such as sedans, in an effort to realize passenger's convenience when getting into or out of the vehicle. In the related art, the side step may be designed as a fixed side step 1 that is simply fixed to a side seal outer panel 2 of a vehicle frame, as shown in FIG. 1, or as an retractable side step 3 that can be automatically opened or closed relative to a vehicle frame 4 using a mechanism, as shown in FIGS. 2A to 2D.

The retractable side step 3 of FIGS. 2A to 2D is configured such that it can be opened from a closed state through a sequential opening process comprising outward extending from the vehicle frame, rotating and descending.

The retractable side step 3 is configured such that the opening of the retractable side step 3 is operated regardless of whether an obstacle is present or not in proximity to the side step 3. When the side step 3 collides with an obstacle, the operation of the side step 3 may be stopped or the control process of the side step 3 may be initialized to the closed state.

Described in brief, the retractable side step 3 is provided with no function of preventing a collision of the side step with an obstacle when the side step is opened. Thus, the art retractable side step 3 is problematic in that, when being operated, obstacles may cause a breakage of the drive unit and breakage of the side step.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an operating apparatus and operating control method of a side step of a vehicle, which can control the opening operation of the side step by being operated in conjunction with an operation of a vehicle door and by detecting whether an obstacle is present or not in the opening operation space of the side step, and which can alarm a user when it is required to avoid the opening of the side step.

In order to achieve the above object, according to one aspect of the present invention, there is provided an operating apparatus of a side step of a vehicle, including: a door sensor for sensing a vehicle door opening signal; an obstacle detection sensor for detecting an obstacle that is present in an opening operation space of the side step, the obstacle detection sensor being provided in each of a left front side step, a left rear side step, a right front side step and a right rear side step; a control unit for determining whether at least one of the left front side step, the left rear side step, the right front side step and the right rear side step maybe opened or not, in response to signals output from both the door sensor and the obstacle detection sensor; and a drive unit for operating the side step so as to open and close the side step in response to a signal output from the control unit.

The operating apparatus may further include: an alarm unit for providing an alarm to a user in response to a signal output from the control unit.

The door sensor may be provided in each of doors mounted to left and right sides of a vehicle.

The obstacle detection sensor may include: a side sensor for detecting an obstacle that is present to a side of the side step when the side step is in a closed state; and a bottom sensor for detecting an obstacle that is present at a location below the side step before the side step is moved down after the side step has been extended outward from the side.

The drive unit may separately open and close the left front, the left rear, the right front and the right rear side steps in response to signals output from the control unit.

The alarm unit may be configured such that the alarm unit provides at least one of a display mode, a voice alarm mode and a vibration mode.

In another aspect, the present invention provides a method of controlling the operation of a side step using the operating apparatus, including: a side step determining operation of determining which side step of a left front side step, a left rear side step, a right front side step and a right rear side step is associated with a door that is opened during a door opening operation; an obstacle determining operation of determining whether an obstacle is present or not in an opening operation space of a side step that has been determined as a target side step at the side step determining operation, prior to starting an opening operation of the side step; and an opening start determining operation of determining whether it is possible or not to open the side step associated with the opened door, according to determination results of the obstacle determining operation.

At the obstacle determining operation, it is determined whether an obstacle is present or not to a side of the side step associated with the opened door using a signal output from a side sensor provided in the side step.

When the signal output from the side sensor indicates that no obstacle is present to the side of the side step, the operation of the side step associated with the opened door may be controlled at the opening start determining operation such that the side step can be extended out.

When the signal output from the side sensor indicates that an obstacle is present to the side of the side step, the operation of the side step associated with the opened door may be controlled at the opening start determining operation such that the side step can be prohibited from being opened, and an alarm is provided to a user, and the side step can remain in a closed state.

The obstacle determining operation may further include: an operation of determining whether an obstacle is present or not below the side step after the side step has been extended out, using a signal output from a bottom sensor associated with the side step.

When it is determined that the signal output from the bottom sensor indicates that no obstacle is present below the side step, the operation of the side step may be controlled at the opening start determining operation such that the outward extended side step can be moved down.

When it is determined that the signal output from the bottom sensor indicates that an obstacle is present below the side step, the operation of the side step may be controlled at the opening start determining operation such that the outward extended side step can avoid a downward movement, and an alarm is provided to the user, and the outward extended side step can be returned to a closed state.

As described above, the operating apparatus and operating control method of the side step of the present invention are configured such that they determine whether an obstacle is present or not in the opening operation space of a side step before starting the opening operation of the side step of the left front, the left rear, the right front and the right rear side steps, and start the side step opening operation exclusively when it is determined that no obstacle is present in the opening operation space. Accordingly, the present invention is advantageous in that it can avoid contact between the side step and an obstacle, thereby preventing breakage of the side step drive unit and breakage of the side step which may be caused by the contact of the side step with an obstacle. Particularly, when it is determined that the side step should be prohibited from being opened, the apparatus and method of the present invention can provide an alarm to the user, thereby improving the user's convenience when using the side step.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIGS. 4 and 5 illustrate the operating apparatus and operating control method of the side step according to an exemplary embodiment of the present invention, wherein FIG. 4 is a block diagram illustrating the construction and control flow of the side step operating apparatus, and FIG. 5 is a flowchart of the operating control method of the side step.

Figure 1:
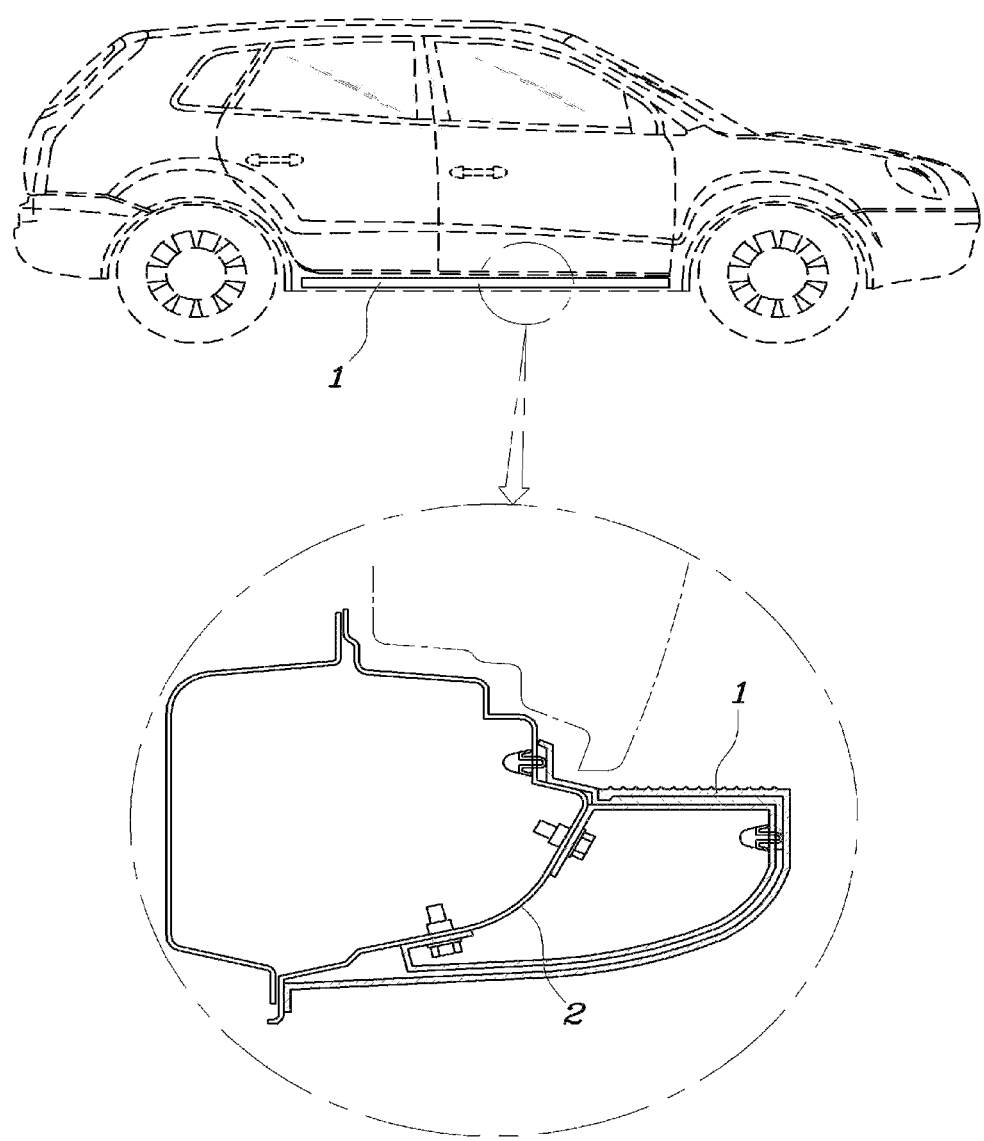
FIG. 1 is a view illustrating a fixed side step.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinbelow, preferred embodiments of an operating apparatus and operating control method of a side step of a vehicle according to the present invention will be described in detail with reference to the accompanying drawings.

Figure 3:
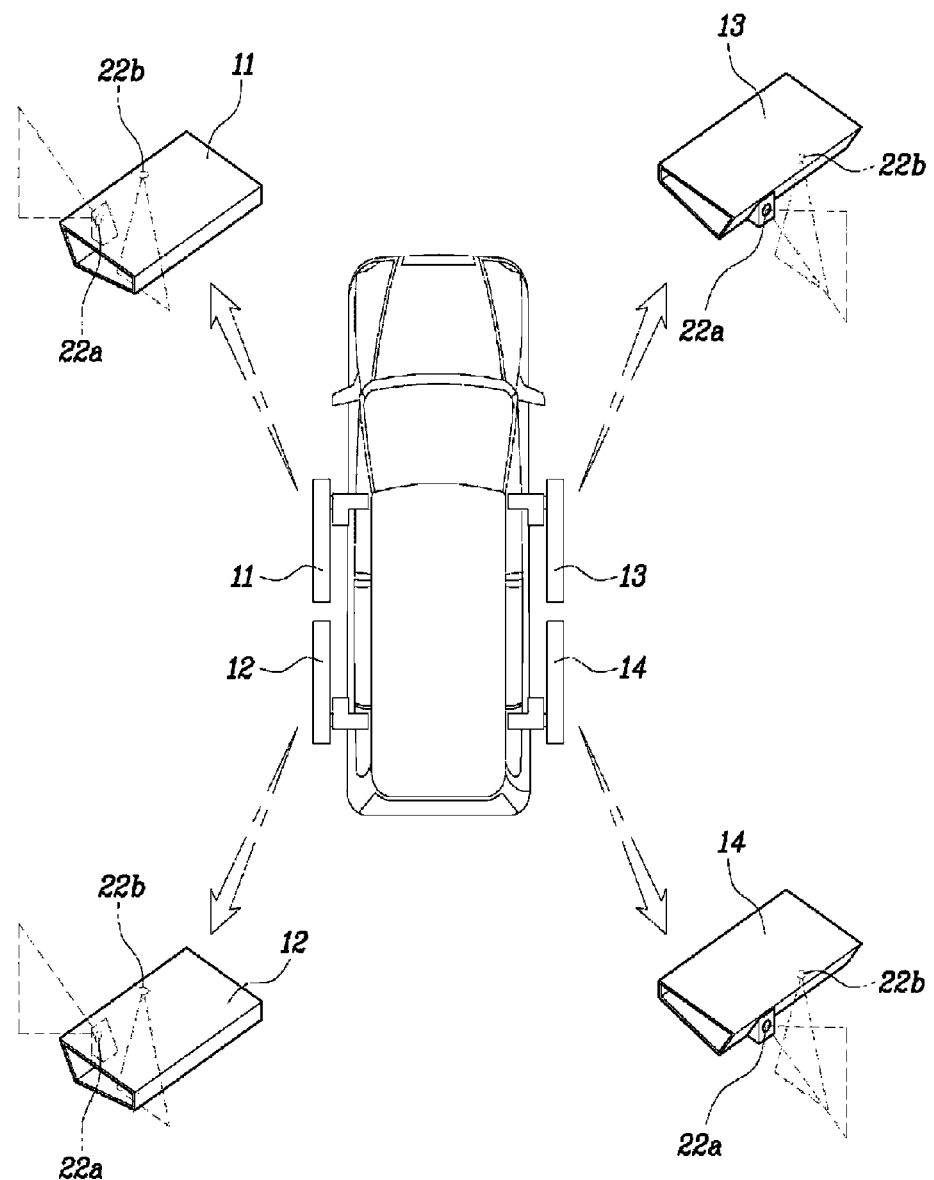
FIG. 3 is a view illustrating left side steps and right side steps that can be controlled by an operating control method of the present invention.
Figure 4:
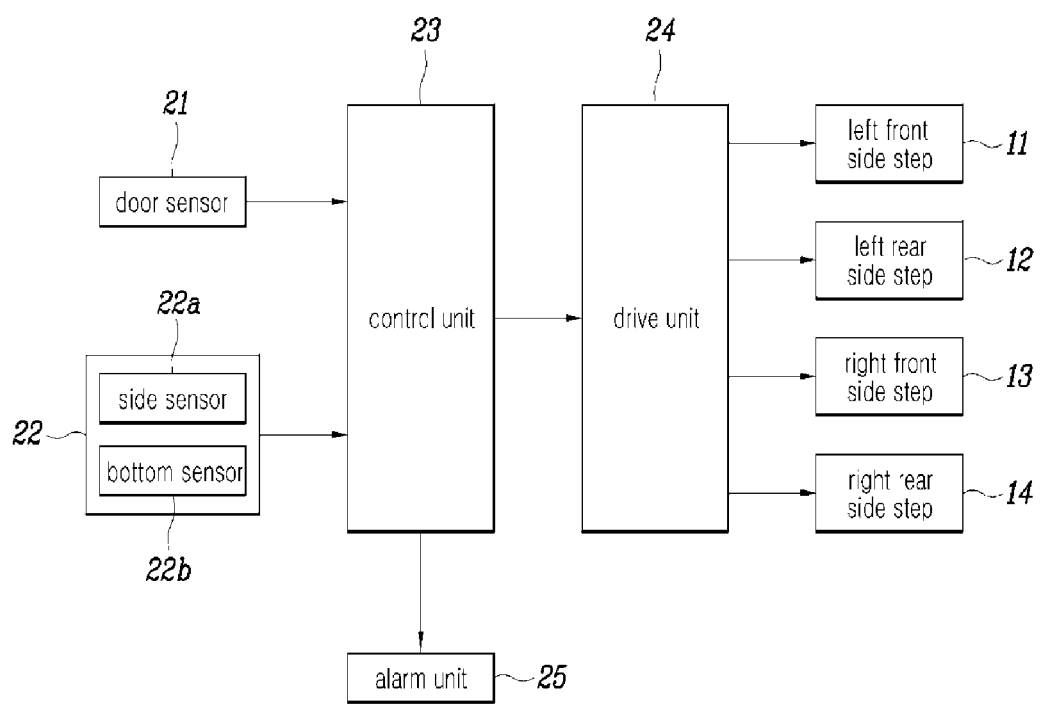

As shown in FIGS. 3 to 5, the side step to which the technique of the present invention is adapted includes a left front side step 11, a left rear side step 12, a right front side step 13 and a right rear side step 14, in which the left front, the left rear, the right front and the right rear side steps 11, 12, 13 and 14 are configured to be independently opened and closed relative to a vehicle frame using respective mechanisms.

Described in detail, the operating apparatus of the side step according to an exemplary embodiment of the present invention includes: a door sensor 21 for detecting a vehicle door opening signal, an obstacle detection sensor 22 that is provided in each of the left front side step 11, the left rear side step 12, the right front side step 13 and the right rear side step 14, and detects whether an obstacle is present or not in an opening operation space of an associated one of the side steps 11, 12, 13 and 14, a control unit 23 that determines whether a side step of the left front side step 11, the left rear side step 12, the right front side step 13 and the right rear side step 14 may be opened or not in response to signals output from both the door sensor 21 and the obstacle detection sensor 22, a drive unit 24 for operating the side steps 11, 12, 13, 14 so as to open and close the side steps in response to signals output from the control unit 23, and an alarm unit 25 for providing an alarm to a user in response to a signal output from the control unit 23.

The door sensor 21 is provided in each of the doors on the left and right sides of a vehicle. In other words, one door sensor 21 is provided in each of a left front door, a left rear door, a right front door and a right rear door.

The obstacle detection sensor 22 includes side sensors 22a that detect whether obstacles are present or not in the outsides of the side steps 11, 12, 13 and 14 when the side steps 11, 12, 13 and 14 are in closed states, and bottom sensors 22b that detect whether obstacles are present or not at locations below the side steps 11, 12, 13 and 14 before the side steps 11, 12, 13 and 14 are moved downward after the side steps have been extended outward from the sides of the vehicle frame.

Here, it is preferred that one side sensor 22a and one bottom sensor 22b be provided in each of the side steps 11, 12, 13 and 14. However, it should be understood that one or more side sensors 22a and one or more bottom sensors 22b may be provided in each of the side steps 11, 12, 13 and 14.

Further, the drive unit 24 is configured such that it can open and close the left front, the left rear, the right front and the right rear side steps 11, 12, 13 and 14 separately in response to signals output from the control unit 23.

In other words, the drive unit 24 includes a gear, a motor, a solenoid, etc., and one drive unit 24 is provided in each of the side steps 11, 12, 13 and 14, so the drive unit 24 can operate the side steps 11, 12, 13 and 14 separately in response to control signals output from the control unit 23.

The alarm unit 25 is configured such that it can simultaneously provide one or more of a display mode (visual mode), a voice alarm mode (auditory mode) and a vibration mode (tactual mode) to a user.

Further, the operating control method of the side step according to an exemplary embodiment of the present invention includes: a side step determining operation of determining which side step of the left front side step 11, the left rear side step 12, the right front side step 13 and the right rear side step 14 is associated with a specific door that is opened during a door opening operation, an obstacle determining operation of determining whether an obstacle is present or not in the opening operation space of the side step that has been determined as the target side step at the side step determining operation, prior to starting the opening operation of the side step, and an opening start determining operation of determining whether it is possible or not to open the side step associated with the specific opened door, according to determination results of the obstacle determining operation.

At the obstacle determining operation, it is determined whether an obstacle is present or not in a place outside the side step associated with an opened door, using a signal output from a side sensor 22a that is provided in the side step.

When it is determined at the obstacle determining operation that the signal output from the side sensor 22a indicates that no obstacle is present in the place outside the side step required to be opened, the control unit 23 controls the operation of the side step associated with the opened door at the opening start determining operation such that the side step can be extended outward from a side of the vehicle frame.

However, when it is determined at the obstacle determining operation that the signal output from the side sensor 22a indicates that an obstacle is present in the place outside the side step required to be opened, the control unit 23 controls the operation of the side step associated with the opened door at the opening start determining operation such that the side step can be returned to a closed state. In the above state, the control unit 23 provides an alarm to the user and controls the operation of the side step such that the side step can remain in the closed state.

In an exemplary embodiment of the present invention, the obstacle determining operation further includes an operation of determining whether an obstacle is present or not below the side step after the side step has been extended outward from the side of the vehicle frame, using a signal output from a bottom sensor 22b associated with the side step.

Here, when it is determined that the signal output from the bottom sensor 22b indicates that no obstacle is present below the outward extended side step, the control unit 23 controls the operation of the side step at the opening start determining operation such that the outward extended side step can be moved down.

However, when it is determined that the signal output from the bottom sensor 22b indicates that an obstacle is present below the outward extended side step, the control unit 23 controls the operation of the outward extended side step at the opening start determining operation such that the outward extended side step can avoid a downward movement. In the above state, the control unit 23 provides an alarm to the user and controls the operation of the side step such that the outward extended side step can be returned to the closed state.

Hereinbelow, the operation of the exemplary embodiment of the present invention will be described.

When a user opens a door so as to get into or out of a vehicle, the control unit 23 determines a door opening state in response to a signal output from a door sensor 21 (S11). Further, the control unit 23 determines a side step that is associated with the door (opened door) in which the door sensor 21 that has output a signal is placed.

Further, when the door is opened, the side sensor 22a provided in the side step associated with the opened door detects an obstacle that is present to the side of the side step within the opening operation space of the side step, and outputs a signal to the control unit 23, before the side step is extended out.

Figure 2A:
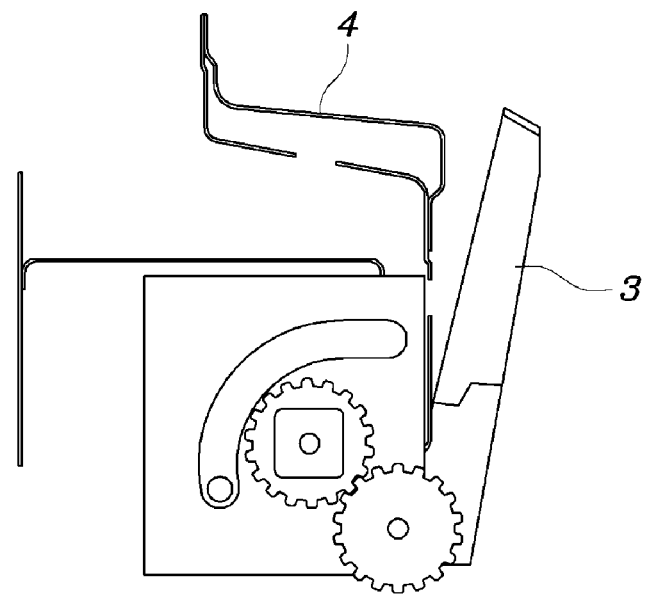
FIGS. 2A to 2D are views illustrating an operation of a retractable side step.
Figure 2B:
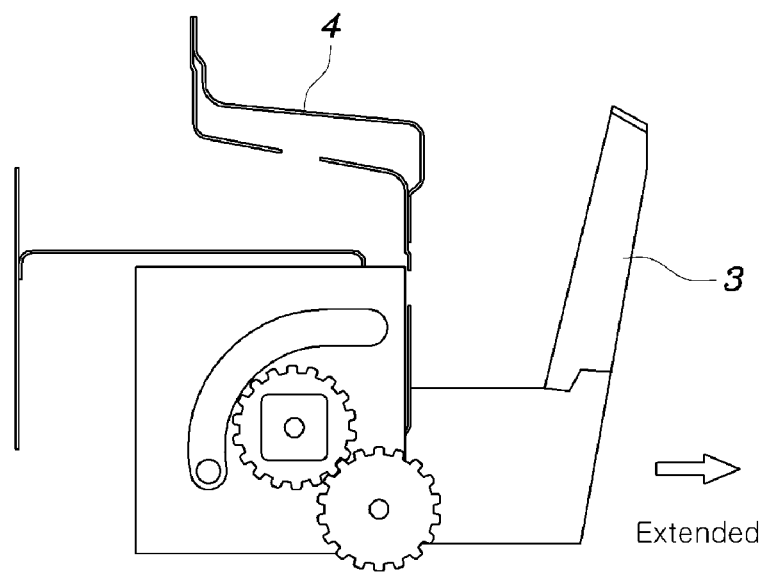

In response to the signal output from the side sensor 22a, the control unit 23 determines whether an obstacle is present or not to the side of the side step (S12). When it is determined that no obstacle is present to the side of the side step, the control unit 23 outputs a control signal to the drive unit 24, thereby operating the drive unit 24. Therefore, the side step associated with the opened door is extended from a closed state shown in FIG. 2A to the side of the vehicle frame, as shown in FIG. 2B, so the extending operation of the side step is performed (S13).

However, when the signal output from the side sensor 22a indicates that an obstacle is present to the side of the side step, the control unit 23 controls the drive unit 24 so as to stop (i.e., to prevent) the extending operation of the side step, and provides an alarm (a visual mode, an auditory mode or a tactual mode) to the user. Here, the control unit 23 controls the drive unit 24 so as to remain the side step in the closed state (S14).

Further, after the side step associated with the opened door has been extended to the side of the vehicle frame, the bottom sensor 22b provided in the side step detects an obstacle that is present at a location below the side step within the opening operation space of the side step, and outputs a signal to the control unit 23.

Figure 2C:
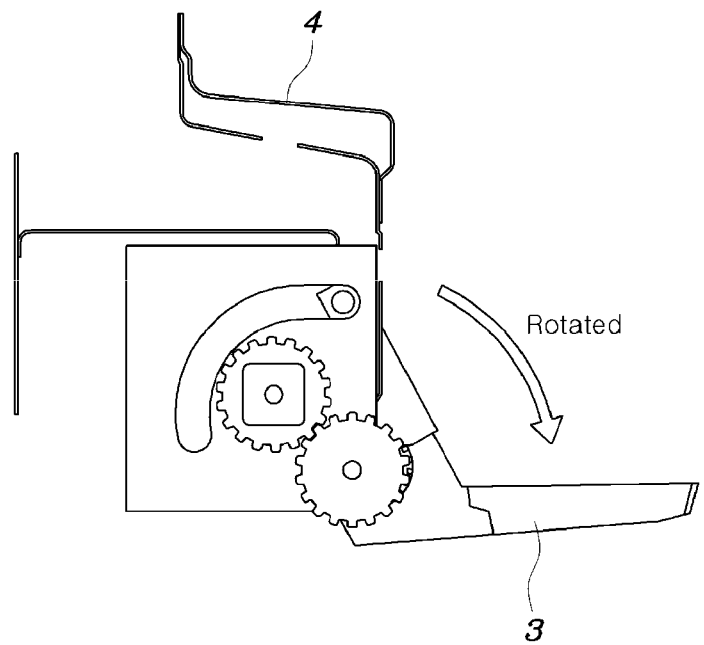
Figure 2D:
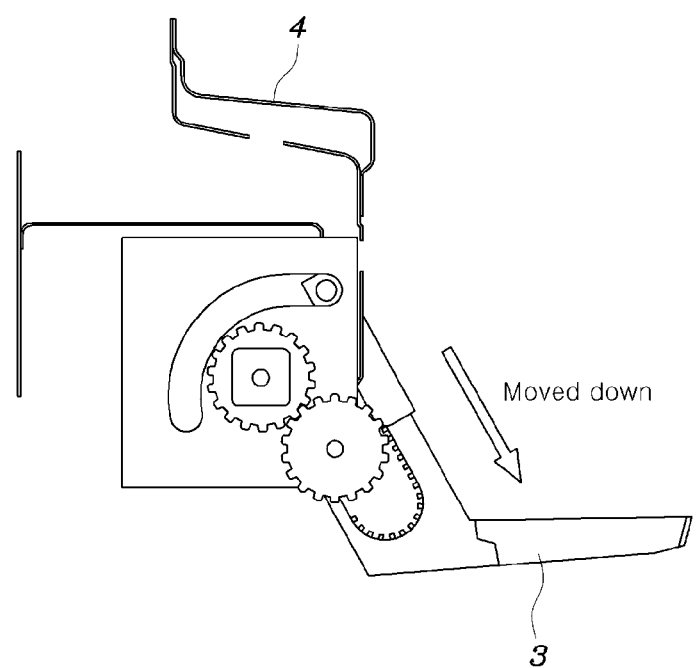

In response to the signal output from the bottom sensor 22b, the control unit 23 determines whether an obstacle is present or not at the location below the side step within the opening operation space of the side step (S15). When it is determined that no obstacle is present, the control unit 23 outputs a control signal to the drive unit 24 so as to operate the drive unit 24. Therefore, the side step that has been extended outward is rotated downward, as shown in FIG. 2C, and is moved down, as shown in FIG. 2D, so the opening operation of the side step is completed (S16).

However, when the signal output from the bottom sensor 22b indicates that an obstacle is present at the location below the side step, the control unit 23 controls the drive unit 24 so as to stop the downward moving operation of the side step, and provides an alarm (a visual mode, an auditory mode or a tactual mode) to the user (S14).

As described above, the exemplary embodiment of the present invention is configured such that it determines whether an obstacle is present or not in the opening operation space of a side step before starting the opening operation of one of the left front, the left rear, the right front, the right rear side steps 11, 12, 13 and 14, and starts the side step opening operation exclusively when it is determined that no obstacle is present in the opening operation space. Accordingly, the present invention is advantageous in that it can avoid a contact between the side step and the obstacle, thereby preventing a breakage of the side step drive unit and a breakage of the side step which may be caused by the contact of the side step with the obstacle.

Further, when it is determined that the side step should be prohibited from being opened, the present invention can provide an alarm, such as a visual mode, an auditory mode or a tactual mode, to a user, thereby improving the user's convenience when using the side steps.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the claims appended hereto and their equivalents.

What is claimed is:

1. An operating apparatus of a side step of a vehicle, comprising:
    a door sensor for sensing a vehicle door opening signal;
    an obstacle detection sensor for detecting an obstacle that is present in an opening operation space of the side step, the obstacle detection sensor being provided in each of a left front side step, a left rear side step, a right front side step and a right rear side step,
    wherein the obstacle detection sensor includes:
        a side sensor for detecting an obstacle that is present to a side of the side step when the side step is in a closed state; and
        a bottom sensor for detecting an obstacle that is present at a location below the side step before the side step is moved down after the side step has been extended outward from the side;
    a control unit for determining whether at least one of the left front side step, the left rear side step, the right front side step and the right rear side step is required to be opened or not, in response to signals output from both the door sensor and the obstacle detection sensor; and
    a drive unit for operating the side step so as to open or close the side step in response to a signal output from the control unit.

2. The operating apparatus of the side step of the vehicle as set forth in claim 1, further comprising:
    an alarm unit for providing an alarm to a user in response to the signal output from the control unit.

3. The operating apparatus of the side step of the vehicle as set forth in claim 2, wherein the alarm unit is configured such that the alarm unit provides at least one of a display mode, a voice alarm mode and a vibration mode.

4. The operating apparatus of the side step of the vehicle as set forth in claim 1, wherein the door sensor is provided in each of doors mounted to left and right sides of the vehicle.

5. The operating apparatus of the side step of the vehicle as set forth in claim 1, wherein the drive unit separately opens and closes the left front, the left rear, the right front and the right rear side steps in response to the signals output from the control unit.

6. A method of controlling an operation of a side step using the operating apparatus as set forth in claim 1, comprising:
    a side step determining operation of determining which side step of the left front side step, the left rear side step, the right front side step and the right rear side step is associated with a door that is opened during a door opening operation;
    an obstacle determining operation of determining whether the obstacle is present or not in the opening operation space of the side step that has been determined as a target side step at the side step determining operation, prior to starting an opening operation of the side step; and
    an opening start determining operation of determining whether it is possible or not to open the side step associated with the opened door, according to determination results of the obstacle determining operation.

7. The method as set forth in claim 6, wherein, at the obstacle determining operation, it is determined whether the obstacle is present or not to a side of the side step associated with the opened door using a signal output from the side sensor provided in the side step.

8. The method as set forth in claim 7, wherein, when the signal output from the side sensor indicates that the obstacle is present to the side of the side step, an operation of the side step associated with the opened door is controlled at the opening start determining operation such that the side step is prohibited from being opened, and an alarm is provided to a user, and the side step remains in a closed state.

9. The method as set forth in claim 7, wherein, when the signal output from the side sensor indicates that no obstacle is present to the side of the side step, an operation of the side step associated with the opened door is controlled at the opening start determining operation such that the side step is extended out.

10. The method as set forth in claim 9, wherein the obstacle determining operation further comprises:
    an operation of determining whether an obstacle is present or not below the side step after the side step has been extended out, using a signal output from the bottom sensor associated with the side step.

11. The method as set forth in claim 10, wherein, when it is determined that the signal output from the bottom sensor indicates that no obstacle is present below the side step, an operation of the side step is controlled at the opening start determining operation such that the outward extended side step is moved down.

12. The method as set forth in claim 10, wherein, when it is determined that the signal output from the bottom sensor indicates that the obstacle is present below the side step, an operation of the side step is controlled at the opening start determining operation such that the outward extended side step avoids the downward movement, and an alarm is provided to the user, and the outward extended side step is returned to a closed state.

* * * * *